3,236,734
PROCESS FOR DYEING HAIR WITH AROMATIC
AMINOHYDROXYL DERIVATIVES
Roger Charle, Soisy-sous-Montmorency, and Robert
Lantz, Paris, France, assignors to Societe Anonyme dite:
L'Oreal, a corporation of France
No Drawing. Filed Feb. 6, 1964, Ser. No. 343,143
Claims priority, application France, Jan. 20, 1959,
784,529, Patent 1,222,700
10 Claims. (Cl. 167—88)

This application is a continuation-in-part of application of Serial No. 2,817, filed January 18, 1960, which is now abandoned.

The present invention relates to a new article of manufacture consisting of a composition which may be used as a coloring agent, and particularly for dyeing living human hair. This composition has the following formula:

(A)
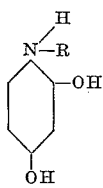

In this formula, R indicates a monovalent alkyl, aryl, alkylaryl or cycloalkyl group, which may be substituted, especially by hydroxyl, alkoxy, amino, alkylamino and dialkylamino groups.

The invention also relates to a process for preparing compositions corresponding to the Formula A and their salts which process is characterized by mixing 1,2,4-trihydroxybenzene and a primary amine R—$NH_2$, in an aqueous medium, protected from the air, and then isolating in a known manner either the reaction product or a salt formed from this product when acted upon by an organic or inorganic acid. (In the formula R—$NH_2$ R has the same significance as in Formula A.)

In a preferred method of carrying out the process of preparing the composition, the reaction is carried out at a temperature below 100° C., and preferably between 10° C. and 40° C. When working at the ordinary temperature of 20° C., the process is completed after a delay which may vary from 1 to 12 days. It is naturally quicker at higher temperatures. The pH of the reaction solution should be between 7 and 12; it may be necessary, in certain cases, to keep the solution within this pH zone by adding an alkalizing agent such as sodium carbonate.

In the following examples the dyestuff is obtained and crystallized in the form of its acid salts because the dyestuff itself is not very stable, but the acid salts are stable and permit crystallization and recrystallization of the various compounds. When it is desired to apply this material to the hair it is applied in the form of an alkaline solution so that the free dyestuff may be oxidized to give its characteristic color. The acid salts used may be either the salts of either organic or inorganic acids. The examples of the inorganic acid are hydrochloric, hydrobromic and sulphuric. The examples of the organic acid are oxalic, trichloroacetic and benzene sulfonic acids.

When the products formed is not very soluble in the reaction mixture, it may be separated by simple filtration. It may also be extracted by means of a solvent. Alternatively, it may be transformed into a salt, for example by adding an acid to the mixture, and the salt then separated out in a conventional manner.

Several specific examples will now be given of methods of carrying out the process of preparing compositions according to the invention, together with several examples showing the use of these compositions. It will of course be understood that the invention may also be carried out in other ways.

In all the examples the proportions are given by weight.

*Example 1*

A solution of 12.5 parts of 1,2,4-trihydroxybenzene and 5.3 parts of monomethylamine in 500 parts of water is kept protected from the air for 6 days at ordinary room temperature. 537 parts of hydrochloric acid at 22° Bé. are then added. The mixture is evaporated after having been dissolved in a mixture of 13.4 parts of hydrochloric acid at 22° Bé. and 7.5 parts of water. The hydrochloride of 2,4-dihydroxy-methylaminobenzene is thus obtained.

*Example 2*

A mixture of 6.25 parts of 1,2,4-trihydroxybenzene, 9.85 parts of cyclohexylamine, and 3.33 parts of acetic acid diluted to 250 parts with water is kept for 5 days protected from the air. Crystals are formed which are dried without heating and then dissolved by heating them in 109 parts of a mixture of equal volumes of hydrochloric acid at 22° Bé. and water. The hydrochloride of 2,4-dihydroxycyclohexylaminobenzene crystallize out on cooling. It may be recrystallized in a mixture of hydrochloric acid and water identical to that previously employed. The triacetylated derivative of 2,4-dihydroxycyclohexylaminobenzene melts at 117° C. If the cyclohexylamine is replaced by 8.75 parts of amino-n-pentane, crystals of 2,4-dihydroxy-n-pentylaminobenzene are obtained. After filtration, these crystals may be transformed into the hydrochloride by dissolving them by heating them with 35.8 parts of hydrochloric acid at 22° Bé. The hydrochloride crystals which form during the cooling of the solution are then separated out by filtration.

*Example 3*

A mixture of 12.5 parts of 1,2,4-trihydroxybenzene, 18 parts of aniline, 4.4 parts of sodium carbonate and a sufficient quantity of water to total a volume of 500 parts is kept protected from the air at ordinary room temperature for five days. The crystals obtained are dried without heating while protected from the air.

These crystals are dissolved by heating them in a mixture of 35.8 parts of hydrochloric acid at 22° Bé. and 60 parts of water.

The hydrochloride of 2,4-dihydroxyphenylaminobenzene is crystallized out by cooling, and purified by recrystallization in a mixture containing the same proportions of hydrochloric acid and water.

The triacetylated derivative of 2,4-dihydroxyphenylaminobenzene thus obtained melts at 122–123° C.

2,4-dihydroxyphenylaminobenzene may be obtained in basic form by vacuum drying the first crystals obtained before treating them with hydrochloric acid, and dissolving them in 210 parts of benzene, which is then evaporated. The residue is then dissolved in 176 parts of benzene and again precipitated by adding heptane. The crystals obtained after recrystallization in heptane are 2,4-dihydroxyphenylaminobenzene and melt at 85.5–86° C.

*Example 4*

A solution of 12.5 parts of 1,2,4-trihydroxybenzene, 24.5 parts of orthoanisidine, 4.4 parts of sodium carbonate, 99 parts of alcohol, and a quantity of water sufficient to produce a total volume of 500 parts, is kept protected from the air for 10 days. This is concentrated, under a vacuum, to 30–40 parts; 60 parts of water and 71.5 parts of hydrochloric acid at 22° Bé. are then added. The mixture is evaporated until dry and 70 parts of water are then added.

The precipitate is then dried without heating it and washed with water. It consists of the hydrochloride of 2,4-dihydroxymethoxy-2'-diphenylamine.

The triacetylated derivative of the base melts at 127–128° C.

*Example 5*

A mixture of 6.25 parts of 1,2,4-trihydroxybenzene, 5.3 parts of paratoluidine, 2.2 parts of sodium carbonate, and 59.5 parts of alcohol is diluted with water to a total of 500 parts and kept protected from the air for eight days. An excess of hydrochloric acid at 22° Bé. (about 35.8 parts) is then added to obtain an acid reaction when tested with Congo red paper. The solution is then evaporated until dry, under a vacuum, and the residue dissolved in absolute ethanol. The alcoholic solution obtained is evaporated until dry, leaving a residue of hydrochloride of 2,4-dihydroxymethyl-4'-diphenylamine which is purified by crystallizing it in a mixture of equal volumes of water and hydrochloric acid at 22° Bé.

The resulting triacetylated derivative melts at 109–110° C.

If the paratoluidine in the preceding preparation is replaced by its ortho isomer, the hydrochloride of 2,4-dihydroxy-2'-methyl diphenylamine is produced. The triacetylated derivative of this base melts at 150–151° C.

The hydrochloride of 2,4-dihydroxy-3'-methyl diphenylamine may be obtained in the same manner by using metatoluidine. The triacetylated derivative melts at 85° C. By replacing the paratoluidine with 6.25 parts of para-anisidine the hydrochloride of 2,4-dihydroxy-4'-methoxy-diphenylamine may be obtained. The triacetylated derivative of the base of the latter composition melts at 130–131° C.

*Example 6*

A mixture of 11 parts of trihydroxybenzene, 10 parts of 4-hydroxyaminobenzene, 4.5 parts of sodium carbonate, and sufficient water to make a total of 100 parts is agitated while protected from the air, at ordinary temperature for four days. The mixture is filtered and the filtrate acidified. It is then evaporated under a vacuum until dry, and 100 parts of water and 14.4 parts of anhydrous sodium acetate are added. It is then extracted 4 successive times with ether, and a mixture of 88.5 parts of hydrochloric acid at 22° Bé. and 50 parts of water is added to the etherized solution, which is then evaporated until dry while protected from the air. The hydrochloride of 2,4,4'-trihydroxy-diphenylamine thus obtained is highly soluble in water.

*Example 7*

The 4-hydroxyaminobenzene in the preceding preparation is replaced by an equal weight of 2-hydroxyaminobenzene and by operating in the same manner the hydrochloride of 2,4,2'-trihydroxy-diphenylamine is obtained.

*Example 8*

A mixture of 12.5 parts of 1,2,4-trihydroxybenzene, 13.5 parts of 4-dimethylaminoaminobenzene, 4.4 parts of sodium carbonate and a quantity of water sufficient to bring to a total of 500 parts is kept for 5 days at ordinary temperatures and protected from the air. The crystals obtained are dried without heating them, while protected from the air, and rinsed with a very little water. They consist of 2,4-dihydroxy-4'-dimethylaminodiphenylamine.

The invention permits hair and fur to be dyed by use of such products. The dyeing may be carried out in several different ways, in which the fibers to be dyed are impregnated with an aqueous composition according to Formula A and the composition is oxidized while still on the fibers.

*Example 9*

A mixture of 20 parts of 1,2,4-trihydroxybenzene and 40 parts of isopropyl amine in the presence of 50 parts of water are kept for 5 days at room temperature out of contact with the air. The crystals formed are dried and after being washed are recrystallized from a solution of 6 N hydrochloric acid. This recrystallization is repeated. The hydrochloride of 2,4-dihydroxyisopropylaminobenzene is obtained. Its elementary analysis gave the following results.

Analysis:

|  | Percent C | Percent H | Percent N |
| --- | --- | --- | --- |
| Calculated | 53.07 | 6.93 | 6.87 |
| Found | 53.27 | 7.60 | 7.57 |
|  | 53.20 | 7.57 | 6.99 |

*Example 10*

A mixture of 20 parts of 1,2,4-trihydroxybenzene and 40 parts of n-butylamine in the presence of water was maintained out of contact with the air for 5 days, at room temperature. The solution was evaporated to dryness, then the residue was dissolved in boiling 6 N hydrochloric acid and allowed to crystallize. The crystals of the hydrochloride of 2,4-dihydroxy-n-butylaminobenzene were obtained. Its elementary analysis gave the following results.

Analysis:

|  | Percent C | Percent H | Percent N |
| --- | --- | --- | --- |
| Calculated | 55.16 | 7.41 | 6.43 |
| Found | 55.09 | 7.97 | 6.77 |
|  | 54.98 | 7.69 | 6.42 |

*Example 11*

A mixture of 20 parts of 1,2,4-trihydroxybenzene and 40 parts of n-butylamine in the presence of water was kept at room temperature out of contact with the air for 6 days. The crystals that were formed were isolated and recrystallized with 4.5 N hydrobromic acid. The hydrobromate of 2,4-dihydroxybutylaminobenzene gave the following elementary analysis.

Analysis:

|  | Percent C | Percent H | Percent N |
| --- | --- | --- | --- |
| Calculated | 45.80 | 6.11 | 5.34 |
| Found | 45.64 | 6.54 | 5.55 |
|  | 45.79 | 6.46 | 5.56 |

*Example 12*

A mixture of 40 parts of cyclohexylamine and 20 parts of 1,2,4-trihydroxybenzene was kept in the presence of water for 5 days at room temperature out of contact with the air. The crystals formed were dried and mixed with a slight excess of 5 N hydrobromic acid. Light yellow crystals were formed. These were recrystallized twice from 4.5 N hydrobromic acid. The crystals of the hydrobromate were 2,4-dihydroxycyclohexylaminobenzene and gave the following analysis after vacuum drying.

Analysis:

|  | Percent C | Percent H | Percent N |
| --- | --- | --- | --- |
| Calculated | 50.00 | 6.29 | 4.86 |
| Found | 50.40 | 6.54 | 4.58 |
|  | 50.23 | 6.12 | 4.97 |

*Example 13*

A mixture of 20 parts of 1,2,4-trihydroxybenzene and 40 parts of butylamine in the presence of water were kept at room temperature out of contact with air for 6 days. After evaporation to dryness the residue was acidified with oxalic acid solution in the ratio of 1 mol. of acid to 2 mols. of the residue. The solution was dried and the crystals were recrystallized in absolute alcohol. After drying under a vacuum the crystals of 2,4-dihydroxybutylaminobenzene were obtained having 2 mols of the base to one mol. of the acid. The elementary analysis was as follows.

Analysis:

|  | Percent C | Percent H | Percent N |
|---|---|---|---|
| Calculated | 58.39 | 7.12 | 6.19 |
| Found | 57.64 | 7.49 | 6.85 |
|  | 57.90 | 7.69 | 8.83 |

*Example 14*

There is prepared a solution of:

| 1,2,4-trihydroxybenzene | g | 12.6 |
| N-monoacetyl-p-phenylenediamine | g | 15 |
| 2 N aqueous NaOH | cc | 15 |
| Water, q.s. 200 cc. | | |

The solution is heated at 80° C. for 6 hours under a nitrogen atmosphere. After cooling, the mixture is acidified with 20 cc. of galcial acetic acid and extracted with diethyl ether. The ethereal extracts are treated with hydrochloric acid (22° Bé.) to which its own volume of water has been added. This solution deposits after 10 hours, a crystalline product which is removed by means of a centrifuge. It is 2,4-dihydroxy-4'-aminodiphenylamine hydrochloride and is obtained in a yield of 3.11 g.

*Elementary analysis.*—Calculated for

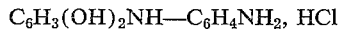

$C_6H_3(OH)_2NH-C_6H_4NH_2$, HCl

|  | Calculated | Found |
|---|---|---|
| C, percent | 57 | 56.13; 56.38; 56.12 |
| H, percent | 5.1 | 5.15; 5.26 |
| N, percent | 11.1 | 11.6 |
| Cl, percent | 14 | 12.28; 12.76; 12.16 |

*Example 15*

The following mixture is kept for 5 days at 37° C. under a nitrogen atmosphere:

G.
1,2,4-trihydroxybenzene _____ 12.6
N,N'-diethyldiaminoethylene _____ 11.6
Water, q.s. 200 cc.

There are then added 50 cc. of HCl (22° Bé.), and the solution is then evaporated under a reduced nitrogen pressure. There remains a tarry mass which is washed at elevated temperature with 50 cc. of absolute ethyl alcohol.

There is thus obtained 2,4-dihydroxy-1-diethylaminoethylaminobenzene dihydrochloride in a yield of about 5 g.

This hydrochloride is recrystallized from hydrochloric acid and then dried over $P_2O_5$ at 100° C. in vacuo to constant weight.

*Elementary analysis.*—Calculated for

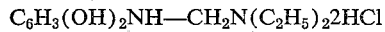

$C_6H_3(OH)_2NH-CH_2N(C_2H_5)_2 2HCl$

|  | Calculated | Found |
|---|---|---|
| C, percent | 48.5 | 48.25; 48.27 |
| H, percent | 7.4 | 7.24; 9.35 |
| N, percent | 9.42 | 9.10; 9.35 |

*Example 16*

White hair is impregnated with an aqueous solution containing 3% of the hydrochloride of 2,4-dihydroxydiphenylamine. After 20 minutes it is rinsed, dried without heat, and impregnated with an aqueous solution containing 3% ammonia gas. The hair, thus impregnated, is left in contact with the air for twenty minutes, shampooed, and rinsed. It is then colored a light auburn with glints of gold.

If in the preceding process, the ammonia solution is replaced by an aqueous solution containing 1% of sodium carbonate, the hair is still dyed a light auburn shade with glints of gold, substantially as before.

By proceeding as set forth in the first paragraph of the present example, but replacing the hydrochloride of dihydroxydiphenylamine with an equal quantity of the hydrochloride of 2,4-dihydroxy-3'-methyl diphenylamine or 2,4-dihydroxy-4'-methyl diphenylamine, the shades produced are similar. On the other hand, by proceeding as set forth in this first paragraph but using the hydrochlorides or 2,4-dihydroxy-4'-methoxy diphenylamine, of 2,4,4'-trihydroxy diphenylamine, of 2,4,2'-trihydroxy-diphenylamine, or of 1-cyclohexylamino-2,4-dihydroxybenzene the hair is colored chestnut brown, dark ash blond, and auburn with reddish glints, respectively.

*Example 17*

White hair is immersed for 20 minutes in an aqueous solution containing 1% of the hydrochloride of 2,4-dihydroxy methylamino-benzene and about 0.4% of sodium carbonate so as to obtain a pH of 6.5. The hair is then exposed to the air for 20 minutes, rinsed, and shampooed. It is dyed an auburn shade with reddish glints.

By proceeding in the same manner, but with a solution containing 3% of the hydrochloride of 2,4,4'-trihydroxy diphenylamine and 1.2% of sodium carbonate, the hair is dyed a golden chestnut shade. A similar shade is obtained by replacing the sodium carbonate with 0.8% of ammonia gas.

Analogous shades may be obtained by replacing the aforementioned hydrochloride with the same quantity of the hydrochloride of 2,4-dihydroxy-4'-methoxy diphenylamine.

If the hair is impregnated by means of a brush, instead of soaking in the solution, as suggested above, and the hair is then exposed to the air for about 30 minutes, similar, but slightly weaker shades are obtained.

Similar but less long lasting shades may be obtained by replacing the ammonia or the sodium carbonate, with 4% of ammonium sesquicarbonate or 2.3% of ammonium carbonate.

*Example 18*

White hair is impregnated with a solution containing 3% of the hydrochloride of 2,4-dihydroxy diphenylamine. After 30 minutes it is rinsed, shampooed, dried without heating, and then impregnated with a solution containing 5% diethylamine. After having been left in contact with the air for 10 minutes it is dried at 40° C. without rinsing. The hair is colored a light reddish chestnut or auburn.

If the same process is carried out, but with the hydrochloride of 2,4-dihydroxy diphenylamine replaced by an equal quantity of hydrochloride of 2,4-dihydroxy-3'-methyl diphenylamine or of 2,4'-dihydroxy-4'-methyl dipheylamine a similar shade is obtained. If the hydrochloride of 2,4,4'-trihydroxy diphenylamine, or 2,4-dihydroxy-4'-methoxy diphenylamine or of 1-cyclohexylamino-2,4-dihydroxy-2,4-benzene is used instead, the hair will be dyed a deep golden blond, chestnut with a mahogany glint, and deep ash blond, respectively.

*Example 19*

The white hair is impregnated with an aqueous solution containing 3% of the hydrochloride of 2,4-dihydroxy diphenylamine. After 20 minutes, it is rinsed, dried without heating, and impregnated with an aqueous solution containing two parts of sodium iodate and 2 parts of acetic acid per 100 parts. After 20 minutes, it is rinsed, and shampooed. It is dyed a pale auburn or chestnut. Similar, but weaker shades are obtained by replacing the sodium iodate solution with an aqueous solution containing 4 parts of potassium persulfate, 2 parts of acetic acid, and 1.5 parts of anhydrous sodium acetate per 100 parts of solution. The oxidation may also be accomplished by means of a solution containing 1.5 parts of sodium perborate and 2 parts of sodium carbonate per 100 parts of solution.

If the same process using sodium iodate is carried out, except for replacement of the hydrochloride of 2,4-dihydroxy-diphenylamine solution with a solution containing the same quantity of the hydrochloride of 2,4-dihydroxy-4'-methyl diphenylamine or of 2,4,4'-trihydroxy diphenylamine, or of dihydroxy-2,4-methoxy-4' diphenylamine, or of 2,4,2'-trihydroxy diphenylamine or of 1-cyclohexylamino-2,4-dihydroxybenzene, the hair is dyed an ash blond shade, auburn with violine glints, light auburn, auburn with greenish yellow glints, and grayish auburn, respectively.

The shades obtained remain substantially the same if the rinsing step preceding the impregnation with the oxidizing solution is omitted.

As shown in Examples 7, 8, 16, 17, 18 and 19 the process may be carried out in one step or in two steps, that is to say, either by impregnating the hair (or other keratinous fibers) with the solution containing both the oxidation dye and an oxidizing agent, or by the first impregnating the hair with a solution containing only the oxidation dye, and then, possibly after rinsing the hair bringing about oxidation of the dye. This oxidation may be accomplished by the action of only the oxygen in the ambient air.

Among the oxidizing agents which may be used are hydrogen peroxide, whether combined with urea or not, a hypochlorite, a chlorite, a chlorate, a bromate, an iodate, a sulfamide derivative having a chlorine atom substituted on the nitrogen, a persulfate or a perborate. (This list is merely exemplary—not exhaustive.)

When the oxidation is produced by the ambient air, it is often advantageous to rinse the fibers in water or wash them with a solution having a pH higher than that of the oxidation dye solution. In order to dye hair, an ammonia solution may be used, or an ammonium carbonate solution, or a solution of a volatile amine, such as diethylamine. Since these products evaporate, the step of rinsing the hair may be eliminated.

The dyeing process which utilizes products conforming to the invention permits fur and hair to be dyed in shades of brown, auburn or chestnut, gray and black which are very natural and well liked for that reason. The possibility of dyeing living hair by simply exposing to the air hair which has been impregnated with the oxidation dye greatly simplifies the dyeing process.

It will be appreciated that the invention comprises the use of dyeing compositions according to the invention, comprising one or more oxidation dyes according to Formula A together with additional dyes or colorants heretofore known, as well as conventional auxiliary agents heretofore used, such, for example, as thickening agents, wetting agents, penetrating agents, solvents, reducing agents, and oxidations catalysts.

What is claimed is:

1. A process of dyeing hair which comprises the steps of impregnating the hair with a solution containing the water soluble acid salt of the compound having the formula:

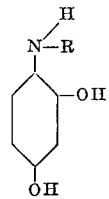

in which R designates a monovalent radical selected from the group consisting of lower alkyl, phenyl, lower alkyl phenyl and cyclohexyl.

2. A process of dyeing hair which comprises the steps of impregnating the hair with a solution containing the water soluble acid salt of 2,4-dihydroxy methylaminobenzene and with an oxidizing agent, and then exposing the hair to the ambient air.

3. A process of dyeing hair, which comprises the steps of impregnating the hair with a solution containing the water soluble acid salt of 2,4-dihydroxy cyclohexylaminobenzene and with an oxidizing agent, and then exposing the hair to the ambient air.

4. A process of dyeing hair, which comprises the steps of impregnating the hair with a solution containing the water soluble acid salt of 2,4-dihydroxy phenylaminobenzene and with an oxidizing agent, and then exposing the hair to ambient air.

5. A process of dyeing hair, which comprises the steps of impregnating the hair with a solution containing the water soluble acid salt of 2,4-dihydroxy-2'-methoxy diphenylamine and with an oxidizing agent, and then exposing the hair to ambient air.

6. A process of dyeing hair, which comprises the steps of impregnating the hair with a solution containing the water soluble acid salt of 2,4-dihydroxy-2'-methyl diphenylamine and an oxidizing agent, and then exposing the hair to ambient air.

7. A process of dyeing hair, which comprises the steps of impregnating the hair with a solution containing the water soluble acid salt of 2,4,4'-trihydroxy diphenylamine, and an oxidizing agent, and then exposing the hair to the ambient air.

8. A process of dyeing hair, which comprises the steps of impregnating the hair with a solution containing the water soluble acid salt of 2,4-dihydroxy-4'-dimethylamino diphenylamine, and an oxidizing agent, and then exposing the hair to ambient air.

9. A process of dyeing hair, which comprises the steps of impregnating the hair with a solution containing the water soluble acid salt of 2,4-dihydroxy-3'-methyl diphenylamine and an oxidizing agent, and then exposing the hair to the ambient air.

10. A process of dyeing hair, which comprises the steps of impregnating the hair with a solution containing the water soluble acid salt of 2,4-dihydroxy-4'-methoxy diphenylamine and an oxidizing agent, and then exposing the hair to ambient air.

References Cited by the Examiner
UNITED STATES PATENTS
3,011,858   12/1961   Lantz et al. _____ 167—88

JULIAN S. LEVITT, Primary Examiner.
LEWIS GOTTS, Examiner.